No. 845,614. PATENTED FEB. 26, 1907.
W. CALLAHAN.
POT HEAD.
APPLICATION FILED MAY 10, 1905.
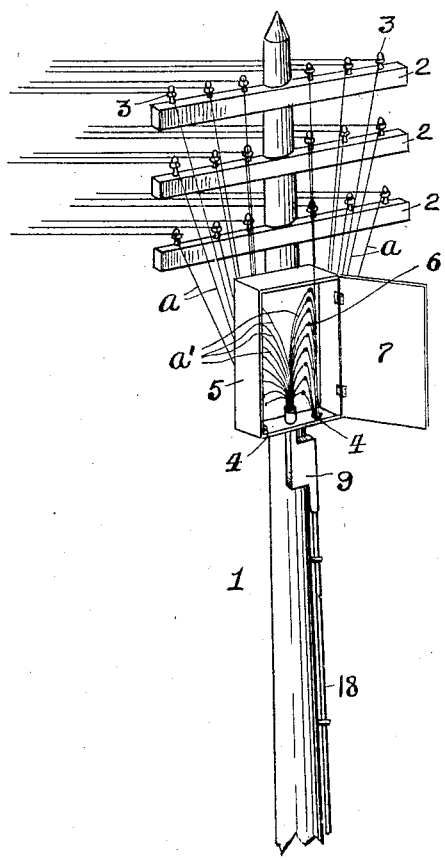
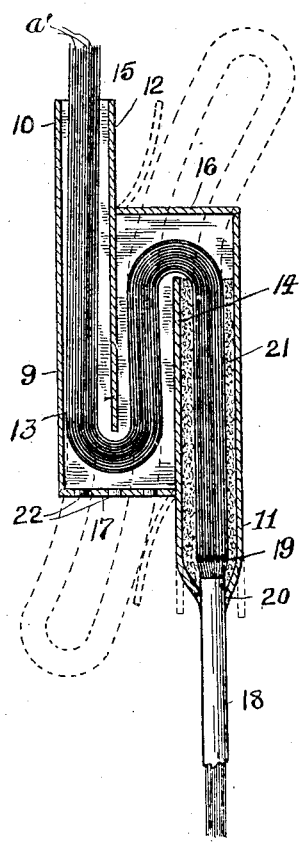
Witnesses:
George Oltsch.
J M. Cole.
William Callahan.
Inventor
By Theodore Dalton
atty.

UNITED STATES PATENT OFFICE.

WILLIAM CALLAHAN, OF SOUTH BEND, INDIANA.

POT-HEAD.

No. 845,614. Specification of Letters Patent. Patented Feb. 26, 1907.

Application filed May 10, 1905. Serial No. 259,719.

*To all whom it may concern:*

Be it known that I, WILLIAM CALLAHAN, a citizen of the United States, residing at South Bend, in the county of St. Joseph and State of Indiana, have invented new and useful Improvements in Pot-Heads, of which the following is a specification.

This invention relates to a pot-head for housing the connection between an underground cable and an overhead system of electric wires.

The object of the invention is to prevent moisture from coming in contact with the wires in the underground cable and to otherwise protect the latter and its connection with the overhead wires.

Heretofore a terminal or junction box has been provided at the joint between the underground cable and the overhead wires to guard against the entrance of rain or snow into the cable; but these boxes are not always efficacious, as they soon deteriorate and become leaky, and an additional protection is therefore required.

The present invention aims to obviate the disadvantages above mentioned by the provision of a "pot-head," the upper end of which terminates in the junction-box and the lower end of which incloses the head of the cable, the box being constructed and arranged to prevent any moisture-laden air or water entering the underground cable.

The invention consists in the construction, combination, and operative aggroupment of the parts, all as will be more fully described hereinafter, illustrated in the accompanying drawings, and finally pointed out in the appended claims.

In the accompanying drawings, Figure 1 is a perspective view of my invention applied to a telephone-pole and to a junction or distribution box of an overhead system. Fig. 2 is a longitudinal sectional view through the pot-head with the upper end of cable mounted therein.

Making renewed reference to the drawings, 1, Fig. 1, designates a telephone-pole, at the top of which are mounted the usual insulator-supporting bars 2, having insulators 3, on which are strung the wires a. The overhead wires enter openings 4 in the bottom of a junction or distribution box 5, from whence they extend upwardly to suitable binding-posts 6 in the box. This distribution-box is, as usual, provided with a door 7, by which access may be gained to the wires and the binding-posts.

9 designates a pot-head which consists of a box-like receptacle having extensions 10 and 11 at the top and bottom on opposite sides. The inner wall 12 of the upper extension extends down into the box to form a partition 13, which terminates short of the bottom of the box, and the inner wall of the lower extension extends up into the box to form a partition 14, which terminates short of the top of the box. In this way three communicating longitudinal compartments are provided in the box, and through these compartments the short rubber insulated wires 15 connecting the overhead wires are conducted, forming a gooseneck in the compartments. In order to insert the wires 15, the top 16 and bottom 17 may be hinged to or integral with the box and in the latter case simply bent back, as shown in dotted lines, the pot-head itself being made of lead. When the top and bottom have been opened and the wires passed through the intermediate or central compartment, the ends may be folded over, as shown in dotted lines in Fig. 2, and passed through the end compartment to form gooseneck-shaped conductors.

The underground cable 18 houses a multiplicity of wires which are insulated with paper, and it is essential that this paper insulation be kept perfectly dry. By the present invention the insulation of the underground cable cannot possibly become dampened on account of the construction herein set forth.

After the paper-insulated wires and the rubber-insulated wires have been joined at 19 the latter are passed through the pot-head in the manner as before described, and the lower end of the extension is then closed by contracting the lead tube and soldering same, as at 20, the original position of the tube being shown in dotted lines in Fig. 2. The end compartment is then filled with the usual composition, (shown at 21,) and the top 16 and bottom 17 are then closed and soldered.

The wires a' extend in separated relation in the distribution-box 5 and connect with the binding-posts 6. It is obvious that water cannot penetrate these rubber-insulated wires, and any water or moisture that may enter the top of the pot-head will find its outlet through the perforations or apertures 22 in the bottom 17, and thus the paper-insulated wires of the underground cable are not only protected by the partition 14, but also by the composition 21.

Having thus described my invention, what I claim is—

1. A pot-head embodying a box having compartments, wires issuing from one of the compartments of the pot-head, a cable issuing from another compartment of the pot-head and joined to said wires with the joint disposed within the last-mentioned compartment.

2. A pot-head embodying a box having partitions extending from each end thereof and terminating short of the opposite ends of the box, and wires extending around the ends of the partitions and issuing from the ends of the box.

3. A pot-head embodying a box having a perforated bottom, a partition extending from the top of the box and terminating short of the perforated bottom, a partition extending from the bottom of the box and terminating short of the top thereof, and wires disposed between the partitions, extending around the ends of the latter and issuing from the end of the box.

4. A pot-head embodying a box having compartments, an underground cable terminating in one of said compartments, connecting-wires joined to the underground cable in said compartment and extending through the other compartments, a suitable composition in the first-mentioned compartment, surrounding the joint of said wires and cable, and a perforated bottom for said other compartment.

5. The combination with a distribution-box for overhead wires, of a pot-head having its upper end extending into the bottom of the distribution-box, a cable entering the bottom of the distribution-box, and wires joined to the cable and disposed in a plurality of folds within the pot-head and finally issuing from the end that enters the box.

6. A pot-head embodying a box having compartments, an underground cable terminating in one of said compartments, and overhead wires joined to the underground cable in said compartment and extending through the other compartments.

7. A pot-head embodying a box having partitions extending from opposite ends thereof to form compartments, and wires extending through said compartments and issuing from the end of the box.

8. A pot-head embodying a box having compartments, wires issuing from one of said compartments, a cable issuing from another compartment and joined to the said wires at a point within the box.

In testimony whereof I affix my signature in presence of two subscribing witnesses.

WILLIAM CALLAHAN.

Witnesses:
   GEORGE OLTSCH,
   G. M. COLE.